United States Patent [19]
Nederlof

[11] 3,934,480
[45] Jan. 27, 1976

[54] ROLLING DIAPHRAGM SEAL BETWEEN TWO RELATIVELY MOVING PARTS

[75] Inventor: Anton Marie Nederlof, Eindhoven, Netherlands

[73] Assignee: U.S. Philips Corporation, New York, N.Y.

[22] Filed: July 11, 1973

[21] Appl. No.: 378,246

[30] Foreign Application Priority Data
July 21, 1972  Netherlands.................... 7210087

[52] U.S. Cl..................... 74/18.2; 92/83; 92/98 D; 92/102; 403/51; 403/288
[51] Int. Cl.²......................................... F16J 15/50
[58] Field of Search....... 92/83, 98 R; 98 D, 99, 100, 92/102; 74/18.2; 403/50, 51, 288

[56] References Cited
UNITED STATES PATENTS

| | | | |
|---|---|---|---|
| 1,038,636 | 9/1912 | Oxnard | 92/98 D |
| 2,293,854 | 8/1942 | Savzedde | 92/98 R X |
| 2,832,223 | 4/1958 | Couraud | 74/18.2 |
| 3,060,754 | 10/1962 | Klingler | 74/18.2 |
| 3,183,789 | 5/1965 | Stelzer | 92/99 X |
| 3,244,013 | 4/1966 | Deschner | 74/18.2 |
| 3,372,624 | 3/1968 | Rietdijk | 92/98 D X |
| 3,568,436 | 3/1971 | Heffner et al. | 60/517 |
| 3,748,970 | 7/1973 | Van Der | 92/83 |
| 3,777,777 | 12/1973 | Katchka | 92/99 X |

Primary Examiner—Martin P. Schwadron
Assistant Examiner—Abraham Hershkovitz
Attorney, Agent, or Firm—Frank R. Trifari; J. David Dainow

[57] ABSTRACT

A connection of a rolling diaphragm to the inner one of two coaxially arranged piston and cylinder elements, the diaphragm having a thickened end accommodated in a groove in the wall of an annular face of the piston. An elastic ring clamped about the piston locks the thickened end of the seal in the groove.

6 Claims, 4 Drawing Figures

ROLLING DIAPHRAGM SEAL BETWEEN TWO RELATIVELY MOVING PARTS

The invention relates to a device comprising a combination of two coaxially arranged elements which are axially movable with respect to each other in a reciprocating manner. The inner element comprises a structural part which is joined on the one side by a second structural part of larger diameter, with an annular face formed as a transition between the two parts. A rolling diaphragm is present as a seal between the two elements, with one end of said rolling diaphragm being connected to the inner element by means of an annular body which surrounds the structural part in a clamping manner.

Examples of known devices of the kind set forth are hot-gas reciprocating engines, cold-gas refrigerators, compressors, reciprocating expansion machines and combustion engines. The combination of the coaxially arranged elements may consist, for example, of a rod and an enveloping housing, a piston and a cylinder, a piston or piston rod and a displacer rod which is passed therethrough.

In a device which is known from U.S. Pat. No. 3,568,436, the rolling diaphragm is connected to the centre part of a rod by means of a sleeve which is fitted about the rod. The rolling diaphragm end is situated between the rod and the sleeve and is clamped against the rod by the sleeve.

A drawback of this construction is the cumbersome and time-consuming mounting and removal of the rolling diaphragm. In practice a one-piece metal sleeve is used, which is slid over the end of the rolling diaphragm. Subsequently, the assembly is mounted on the relevant rod part in a clamping manner. The sleeve is a one-piece construction because with the usually comparatively small rod diameters, lack of space precludes the use of two-piece sleeves. In the latter case additional space is required for coupling the sleeve pieces to each other, for example, by means of screws.

The one-piece metal sleeve can be slid to the centre part only over a rod part having the same or a smaller diameter than the centre part. In the known construction this means that the piston which is connected to the upper rod part of smaller diameter must be removed before mounting can take place. This is because the lower rod part has a diameter which is larger than that of the centre part.

Disassembly is cumbersome and unattractive because it can be effected only in a destructive manner by cutting open the clamping sleeve, so that the sleeve can no longer be used, while the rolling diaphragm is liable to be damaged during the cutting operation.

Furthermore, in the known construction the rolling diaphragm end is liable to slide along the rod surface together with the surrounding sleeve, or the rolling diaphragm end is liable to come loose from the sleeve. In most devices a pressure difference exists between the two sides of the rolling diaphragm, so that tensile forces are exerted on the rolling diaphragm end which stimulate disengagement.

SUMMARY OF THE NEW INVENTION

The invention has for its object to provide an improved construction in which the above drawbacks are eliminated. To achieve this object the device according to the invention is characterized in that the thickened rolling diaphragm end is accommodated in a groove in the wall of the annular face, the annular body being a ring of elastic material which is arranged directly against the wall of the structural part; the side of the said ring which faces the annular face locks the thickened rolling diaphragm end in the groove.

The elastic ring can be quickly and readily mounted and removed without the risk of damage because the ring can be readily slid over a thick structural part to a thinner part. The fitting of the ring via a thickened rod part, for example, can then be effected with prior removal of the piston from the rod end which is remote from the thickened rod part being necessary. One end face of the ring which is directly clamped onto the structural part ensures that the thickened rolling diaphragm end is reliably locked in the groove in the annular face.

In a preferred embodiment of the invention the other side of the structural part adjoins a third structural part whose diameter differs from that of the structural part, and a second annular face is formed as a transition between these two parts. The third structural part has a diameter which is larger than that of the structural part, with the ring extending over the entire free axial dimension of the structural part between the two annular faces.

Because both the second and the third structural part have a diameter which is larger than the structural part, and because the ring extends along the structural part over the free axial dimension of the annular duct thus formed, the ring cannot slide along the inner element and proper locking of the rolling diaphragm end is guaranteed under all circumstances.

In a further preferred embodiment of the device according to the invention, the ring has an outer diameter which is equal to the diameter of the third structural part; the ring constitutes, in conjunction with the third structural part, a continuous cylinder wall along which the rolling diaphragm can roll.

The absence of discontinuous transitions in the rolling of the rolling diaphragm benefits the service life of this diaphragm. The service life of the rolling diaphragm is further prolonged in that this diaphragm is at least partly in engagement with the elastic ring instead of with a rigid metal wall.

The invention will be described in detail hereinafter with reference to the diagrammatic drawings which are not to scale.

DESCRIPTION OF THE PREFERRED EMBODIMENT

Figures 1, 2:
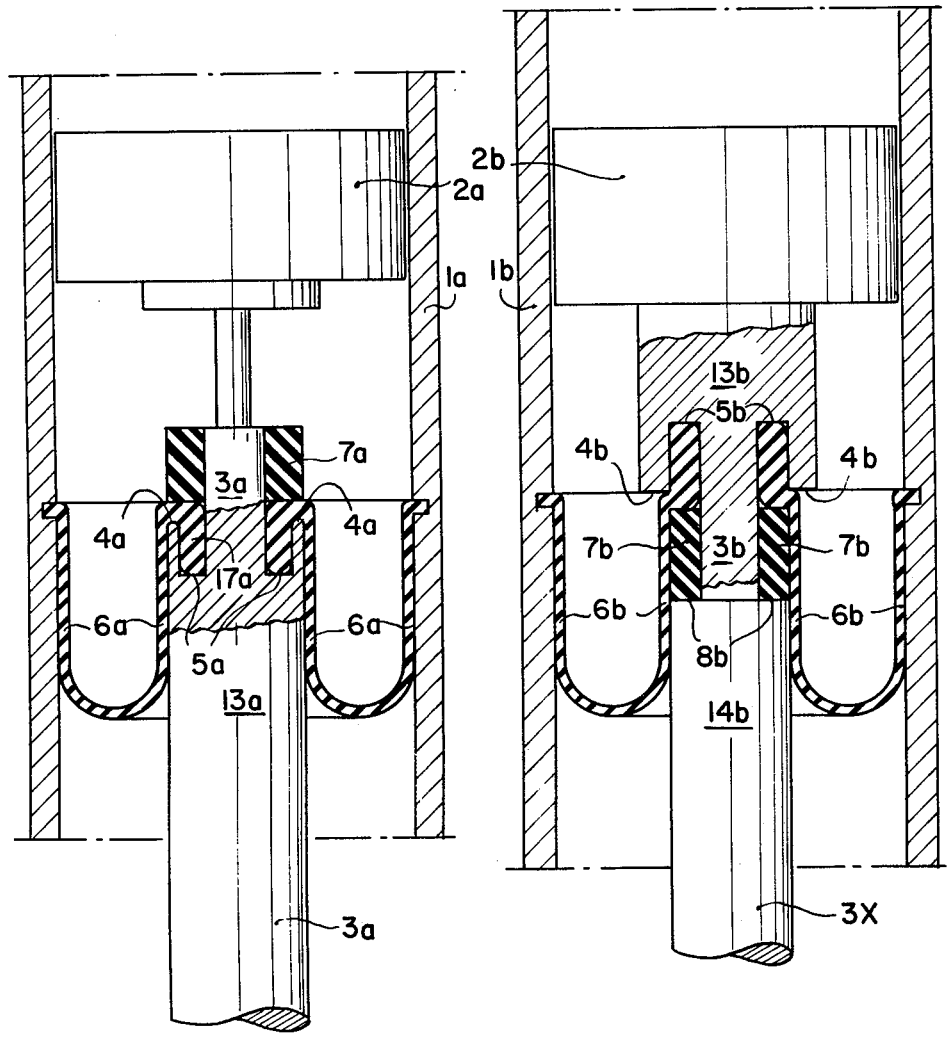
FIGS. 1, 2 and 3 are longitudinal sectional views of combinations of a piston/piston rod and a cylinder, between which a rolling diaphragm is connected.

The reference numeral $1a$ in FIG. 1 denotes a cylinder in which a piston $2a$ with piston rod $3a$ coupled thereto are movable in a reciprocating manner. Piston rod 3 comprises a structural part $3a$, and also an adjoining second structural $13a$ of larger diameter. Present in the annular $4a$, formed by the transition between the two parts 3a and 13a is a groove 5a in which the thickened end 17a of a rolling diaphragm 6a is accommodated. An elastic ring 7a is in clamping engagement with the structural part 3a. The lower side of ring 7a locks the thickened rolling diaphragm end 17a in groove 5a.

The rolling diaphragm can be very simply and quickly connected to and disconnected from the piston rod 3. The elastic ring 7a can be slid from the thicker structural part 13a to part 3a, so that disassembly of piston 2a is not required. Due to the direct contact and the large contact area of the clamping elastic ring 7a and structural part 3a, the ring properly retains its place and the thickened rolling diaphragm end remains properly locked in groove 5a.

Figure 3:
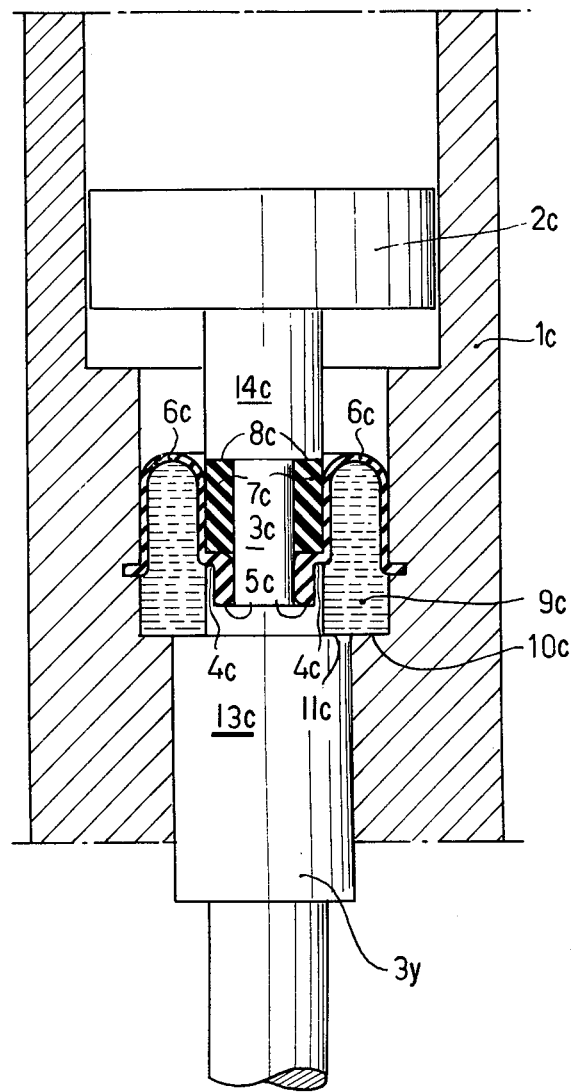
Figure 4:
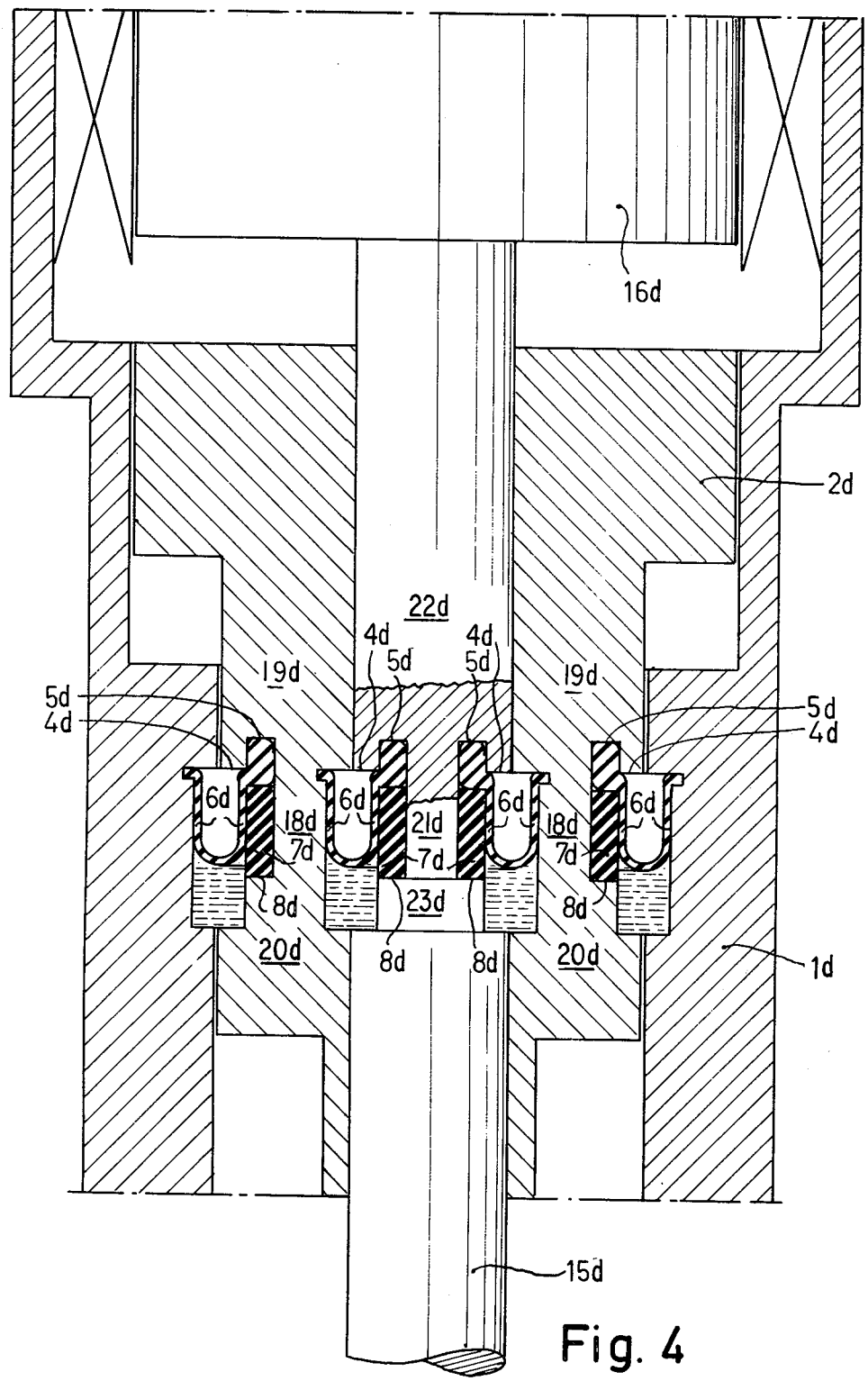
FIG. 4 is a longitudinal sectional view of a cylinder in which a piston is movable, a displacer rod being passed through the piston. A liquid-supported rolling diaphragm is connected between piston and cylinder as well as between piston and displacer rod passed therethrough.

In FIGS. 2 and 3 the same references are used for most parts which correspond to those of FIG. 1 but with suffix designations a for FIG. 1, b for FIG. 2, c for FIG. 3, and d for FIG. 4. Rod 3x in FIG. 2 comprises a third structural part 14b which has a diameter which is larger than that of structural part 3b, and a second annular face 8b is formed. Elastic ring 7b extends over the entire free axial dimension of structural part 3b between the annular faces 4b and 8b thus precluding axial displacement of the ring. The ring has an outer diameter which is equal to the diameter of third structural 14b. This is advantageous because the rolling diaphragm now rolls down partly along elastic ring 7b and partly along part 14b.

Because of the constant diameter, rolling down is now continuous without transitions. This benefits the service life of the rolling diaphragm.

The convex side of rolling diaphragm 6c of the device shown in FIG. 3 faces the piston 2c the rolling diaphragm being supported by liquid in liquid space 9c. As a result of the suitably chosen surfaces of the annular faces 10c and 11c, liquid space 9c has a constant volume at relative movement of rod 3y cylinder 1c. A constant pressure difference is maintained across the diaphragm by means of a control unit not shown, for example, as described in French Pat. Specification No. 1,326,063. published 1963, corresponding to U.S. Pat. No. 3,241,379.

The rolling diaphragm 6c rolls down mainly along elastic ring 7c which again cannot move in the axial direction as a result of the limitation formed by annular face 8c.

In the device shown in FIG. 4, the liquidsupported rolling diaphragms 6d are present, one between piston 2d and cylinder 1d and one between piston 2d and a displacer rod 15d which is passed therethrough and which is connected to a displacer 16d.

The connection of the rolling diaphragm between cylinder and piston is identical to the connection of the rolling diaphragm to the piston rod as shown in FIG. 2d. To this end, piston 2 has a part 19d and a part 20d, each part having a diameter which is larger than that of the intermediate part 18d.

The rolling diaphragm between the piston and the displacer rod is also connected to the displacer rod in an identical manner. To this end, the displacer rod comprises a part 21d having a diameter which is smaller than that of the adjoining parts 22d and 23d.

What is claimed is:

1. In an apparatus including a cylinder element, a piston element reciprocally movable in the cylinder, a rod extending axially from the piston with an annular space defined between said rod and cylinder element, and a rolling diaphragm seal and means for securing same between said rod and cylinder element for separating said annular space into two portions, the improvement in combination therewith wherein, said rod comprises a first part of first diameter, and an axially adjacent second part of second larger diameter, with a shoulder defined at the transitional area between said first and second parts and an annular groove extending lengthwise generally axially inward from the surface of said shoulder, said seal being a tubular member formed by a tubular wall with first and second ends, and having wall thickness along its length and greater thickness at the first end, said groove width being approximately the same as the thickness of said seal's first end, said first end being removably located in said groove and said second end being secured to said cylinder, said apparatus further comprising an annular member of elastic material movable between first and second positions on said rod, the first position of said annular member being spaced from said shoulder and thus defining therebetween a gap of smaller length than the thickness of said first end of the seal for locking said first end in said groove, said second position of the member being spaced axially farther from the first position and from said first end of the seal to permit removal of said first end from the groove.

2. Apparatus according to claim 1 wherein said second part of the rod is axially spaced from said piston, and said first part is intermediate the piston and said second part.

3. Apparatus according to claim 1 wherein said first part is axially spaced from said piston and said second part is intermediate the piston and said first part.

4. Apparatus according to claim 8 wherein said rod further comprises a third part axially adjacent said first part and remote from said second part, said third part having diameter greater than said first part with a second shoulder defined at the transitional area between said first and third parts, said annular member having outer diameter generally equal to said third part diameter, whereby said annular member when in said first position has one end abutting said seal at said groove and its other end abutting and removably secured at said second shoulder.

5. Apparatus according to claim 1 wherein said piston and cylinder elements have a common longitudinal axis and wherein said groove and said first end of the seal when in said groove, extend axially relative to said axis.

6. In an apparatus including a cylinder element, a piston element reciprocally movable in the cylinder, a rod extending axially from the piston with an annular space defined between said rod and cylinder element, and a rolling diaphragm seal and means for securing same between said rod and cylinder element for separating said annular space into two portions, the improvement in combination therewith wherein, said rod comprises a first part of first diameter, and an axially adjacent second part of second larger diameter, with a shoulder defined at the transitional area between said first and second parts and an annular groove extending lengthwise generally axially inward from the surface of said shoulder the groove having radial width defined by an inner diameter and an outer diameter, the inner diameter being substantially the same as said first diameter, the seal being a tubular member formed by a tubular wall with first and second ends, and having wall thickness along its length and greater thickness at the first end, said groove width being approximately the same as the thickness of said seal's first end, said first end being removably located in said groove and said second end being secured to said cylinder, said apparatus further comprising an annular member of elastic material and movable between a first position on said rod and a second position, the first position of said annular member being spaced from said shoulder and thus defining therebetween a gap of smaller length than the thickness of said first end of the seal for locking said first end in said groove, said second position of the member being spaced axially farther from the first position and from said first end of the seal to permit removal of said first end from the groove.

* * * * *